Patented Apr. 14, 1936

2,037,322

UNITED STATES PATENT OFFICE 2,037,322

PIGMENTED FILM-FORMING COMPOSITION

Henry A. Gardner, Washington, D. C.

No Drawing. Application May 23, 1934, Serial No. 727,201

10 Claims. (Cl. 134—58)

The present invention relates to pigments adapted for use in making film-forming coating compositions such as paints, enamels (i. e., pigmented varnishes), and pigmented lacquers, and is concerned more particularly with the provision of such pigmented film-forming coating compositions containing as all or a part of the pigment content thereof a metallic salt of phthalic acid.

It is, of course, known that film forming compositions may be prepared by dissolving phthalic acid compounds of glycerin, with or without the addition of suitable plasticizers, in suitable solvents, and that such clear solutions may be pigmented whereby to yield opaque protective coatings. These phthalic acid glycerides dry to a very pronounced hardness, and are durable under certain conditions.

However, metallic phthalates in the form of opaque, relatively insoluble pigments, heretofore have not been utilized by the industry. Relatively insoluble metallic phthalates as the opacifying solid pigment of a coating composition are distinct from the use of a solution of phthalic acid glyceride, which latter is the only form in which phthalic acid heretofore has been employed in this industry.

I have found that such metal salts of phthalic acid as are relatively insoluble in water and in commonly encountered organic solvents may be incorporated in oil paints, in varnishes, or in cellulosic lacquers giving good hiding power and color to the resulting compositions. I have found that the relatively water-insoluble metallic phthalates may be ground to a fineness suitable in pigments adapted for use in film-forming compositions; that they prove to be durable upon weathering under trying conditions; that they do not react with the commonly encountered ingredients of film-forming compositions; and are stable. Certain metallic phthalates including especially lead phthalate also have been found to be adapted for use as constituents of vitreous enamel fluxes (replacing litharge); also, for use as constituents of rubber mixes (replacing litharge or white lead).

I have prepared a number of metallic phthalate pigments, and in general they may be prepared by the following illustrative method: phthalic anhydride is dissolved in water, and silver carbonate is added gradually. The mass effervesces as the carbon dioxide is expelled. After washing and drying, a white silver phthalate is formed, containing about 56% of silver. In a similar manner, a barium phthalate may be prepared, which is brilliantly white and dense, containing about 51% of barium oxide. In a similar manner, a mercury phthalate may be prepared which contains approximately 52% of mercury. This product also is a very dense white pigment. Similarly, a pigment may be produced by adding copper carbonate to phthalic anhydride water solution. After washing and drying, a greenish colored pigment is produced, which contains about 32% of CuO. Many other metallic phthalates, including the phthalates of titanium, thorium, iron and nickel, have been prepared by like methods. Two which gave the most interesting results in my paint experiments were prepared by the following methods:

Example A

Dissolve 44 grams of phthalic anhydride in 2 liters of boiling water. Perfect solution should be obtained. Gradually and slowly add 77 grams of basic carbonate of lead. Great effervescence will be noticed, since the phthalic anhydride, acting as an acid, will drive off the carbon dioxide from the basic carbonate of lead and immediately form lead phthalate. After the reaction has been completed, which generally requires about 15 or 20 minutes, the mass is washed, pressed and dried. A finely divided, white powder results.

Example B

Dissolve 152 grams of lead acetate crystals (sugar of lead) in 1000 cc. of water. Then separately dissolve 60 grams of phthalic anhydride in 2000 cc. of boiling water. Add this latter solution to the previous solution, stirring rapidly. A dense white precipitate of lead phthalate forms immediately. The phthalic anyhydride is completely precipitated by the lead acetate. Wash by decantation, filter-press, and dry. A dense, white pigment results.

The invention includes the concept of preparing useful opaque film-forming compositions from such metallic phthalates—either as the sole or main pigment constitutent thereof or in the form of a composite pigment obtained by coating a metallic phthalate over the surfaces of particles of another pigment. Such composite pigments may be prepared by, for instance, precipitating the desired metallic phthalate, in the presence of finely divided pigment, and in liquid medium.

In its preferred embodiment, the present invention consists of a dispersion of a white pigment comprising, or consisting essentially of, lead phthalate in a film-forming coating composition of one or another of the types above mentioned. Lead phthalate is a particularly dense, brilliantly white, body which is practically insoluble in water and in the usual organic solvents: it may be ground in oil or varnish or lacquer to a desirable dispersion thereof, and such dispersions have been found to dry hard and to weather very satisfactorily. However, the invention includes the employment in the relation stated of such other metal phthalates as are relatively water-insoluble, including phthalates of copper, lithium, cobalt, mercury, titanium, cadmium, barium, silver, manganese and iron. Certain of these metal phthalates are colored (e. g., brown in the case of the iron salt, green-blue in the case of the copper salt, flesh color in the case of the manganese salt, etc.), and yield correspondingly colored dispersions. Where water-solubility is of minor importance, other metallic phthalates such as the phthalates of nickel, thorium, zinc, uranium, beryllium, cerium and the like, may be employed, but I prefer to employ in the present relation the relatively insoluble salts aforesaid.

A useful composite pigment comprising a metallic phthalate may be produced by reacting phthalic acid, in aqueous solution, with a reactive compound of the desired metal (e. g., with silver carbonate or basic lead carbonate, or with a solution of lead acetate, or with a reactive compound of another metal), in the presence of at least one other opaque pigment such, for instance, as white lead, zinc oxide, lithopone, or titanium oxide, in such proportions as to yield a composite comprising a major proportion (e. g., 80 to 50%) of the second pigment, and a minor proportion (e. g., 20 to 50%, and preferably 40% or less) of the phthalate salt coating the particles of the second pigment. Thus, I may coat with a white phthalic acid metal salt (e. g., lead or silver phthalate) the surfaces of individual particles of a white pigment (e. g., lithopone), whereby to yield a white composite pigment having desirable properties. Of course, other metallic salts of phthalic acid similarly may be coated over the surfaces of individual particles of another pigment.

The invention will be described in further detail with reference to the following illustrative examples:

*Example I*

A good house paint of white color was prepared by grinding lead phthalate in linseed oil, in about the proportions of 60 parts by weight of the salt to about 30 parts by weight of the oil, 5 parts by weight each of turpentine and of the usual drier solution of lead and manganese linoleates being added.

The linseed oil, solvent diluent and drier of the foregoing example may be substituted by their known equivalents. Thus, for linseed oil there may be substituted perilla oil or mixtures of heat-treated tung oil and fish oil.

The lead phthalate of the above example may be substituted in whole or in part by another metallic phthalate salt. Also the lead phthalate of the foregoing example may, with good results, be replaced by a corresponding or suitable amount of a composite pigment comprising zinc oxide pigment the surfaces of the individual particles of which carry a coating of a white metallic phthalate such as lead phthalate.

*Example II*

30 parts by weight of copper phthalate were ground in 70 parts by weight of a solution of shellac, in alcohol, of freely brushable consistency. The resulting product was a good toxic antifouling paint of a greenish color.

Mercury phthalate may be substituted in whole or in part for the copper phthalate of the above described toxic anti-fouling paint with good results.

Relatively insoluble metal phthalates may similarly be incorporated in oil varnishes, yielding pigmented varnishes or enamels of good hiding power and durability.

*Example III*

10 parts of finely sub-divided titanium phthalate pigment were dispersed in about 90 parts by weight of a clear lacquer consisting of 10 parts of cellulose acetate dissolved in 20 parts by weight of the acetate of ethylene glycol monoethyl ether and 60 parts of acetone or other ketones, the solution containing about 10 parts by weight of dimethyl phthalate plasticizer. The resulting product was an opaque lacquer having good resistance to weathering and good hiding power.

The substitution of lead phthalate for the titanium salt of the foregoing example yields a white lacquer of valuable properties from the standpoint of hiding power, weathering, and true whiteness. If a colored lacquer is required, copper phthalate or other colored phthalate metal salt may be substituted for part or all of the titanium or lead salt aforesaid.

The lacquer may comprise another ester of cellulose than the acetate, or an ether of cellulose, known to yield desirable lacquers; and the liquid ingredients of the lacquer may be such other solvents and plasticizers as already are known to be adapted for use in preparing cellulosic lacquers.

*Example IV*

A synthetic resin varnish was prepared by cooking together 100 grams of a phenol-formaldehyde resin and 200 grams of tung oil until proper body had been obtained. This was thinned with 300 grams of turpentine and a small amount of drier was added. Into the 600 grams of the resulting synthetic resin varnish there was ground in a pebble mill, for a period of about 8 hours, 600 grams of lead phthalate pigment. A white, quick-drying film forming material resulted.

In the foregoing examples the relative proportions are not to be considered as being critical, since it will be appreciated by those skilled in this art that reasonable variation in the proportions is contemplated.

I claim:

1. A pigment product, being a composite comprising a pigment the individual particles of which carry a deposit of a pigment consisting essentially of a metallic salt of phthalic acid which is insoluble in water and in common organic solvents.

2. A pigment product, being a composite comprising a pigment the individual particles of which carry a deposit of lead phthalate.

3. A pigmented film-forming composition containing a composite pigment comprising a pigment the surfaces of individual particles of which carry a deposit of a metallic salt of phthalic acid which is insoluble in water and in common organic solvents.

4. A pigmented film-forming composition containing a composite pigment comprising a pigment the surfaces of individual particles of which carry a deposit of lead phthalate.

5. An oil paint containing a composite pigment comprising a pigment the surfaces of the individual particles of which carry a deposit of a metallic salt of phthalic acid which is insoluble in water and in common organic solvents.

6. A pigment product, being a composite comprising a white basic lead pigment the individual particles of which carry a deposit of a pigmentary metallic salt of phthalic acid which is insoluble in water and in common organic solvents.

7. A pigment product, being a composite comprising a white basic lead pigment the individual particles of which carry a deposit of lead phthalate.

8. A film-forming composition comprising a film-forming liquid in which there are suspended particles of white basic lead pigment carrying deposits of a pigmentary metallic salt of phthalic acid which is insoluble in water and in common organic solvents.

9. A film-forming composition comprising a film-forming liquid in which there are suspended particles of white basic lead pigment carrying deposits of lead phthalate.

10. A film-forming composition containing as a pigment finely subdivided lead phthalate.

HENRY A. GARDNER.